W. JENKINS.
HOLDING DEVICE FOR COGS.
APPLICATION FILED AUG. 29, 1910.
1,056,687.
Patented Mar. 18, 1913.
2 SHEETS—SHEET 1.
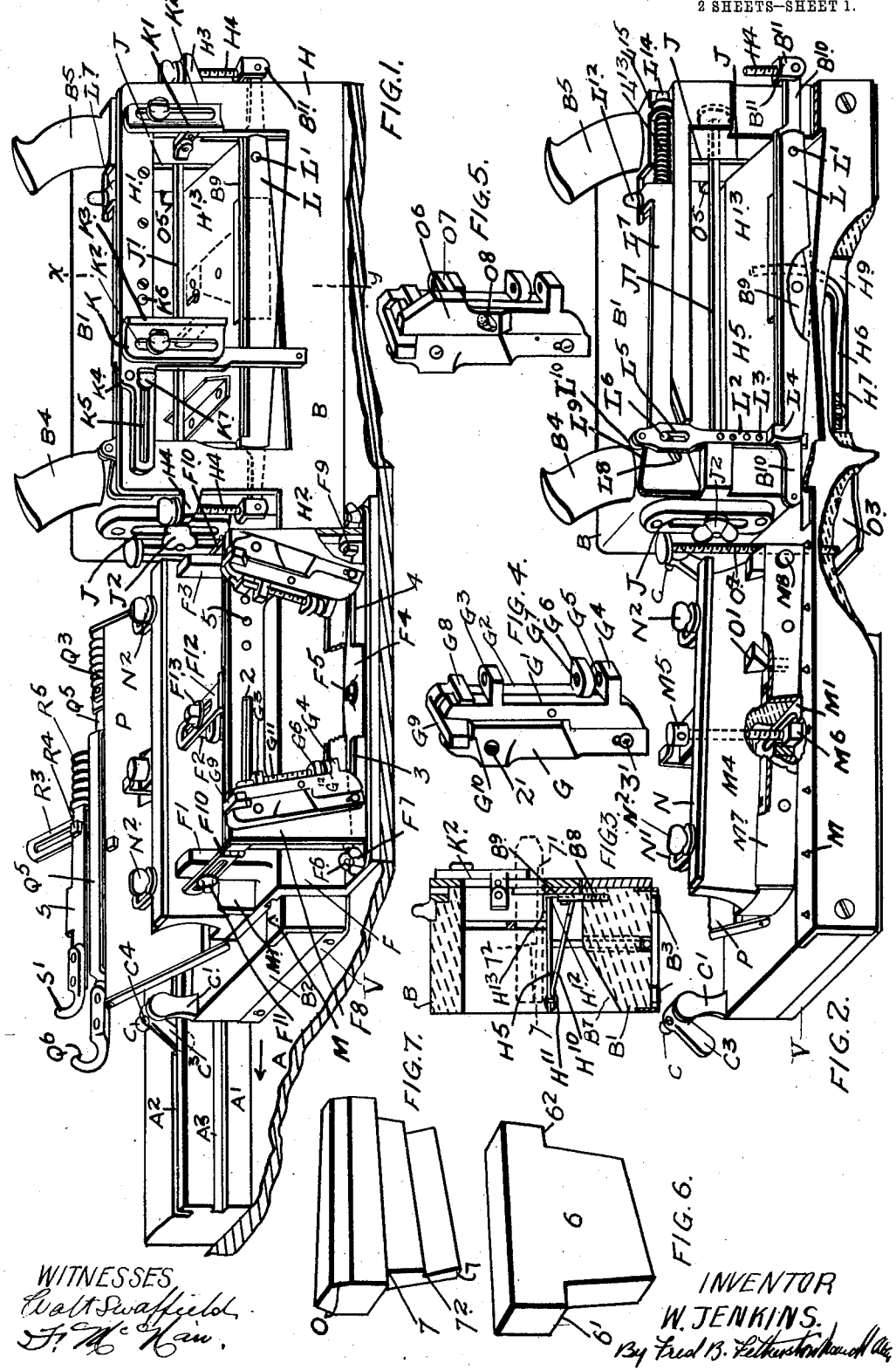
WITNESSES
INVENTOR
W. JENKINS.

W. JENKINS.
HOLDING DEVICE FOR COGS.
APPLICATION FILED AUG. 29, 1910.

1,056,687.

Patented Mar. 18, 1913.
2 SHEETS—SHEET 2.

WITNESSES.
H. T. Young
J. Hallat

INVENTOR.
WILLIAM JENKINS
by
Fred B. Fettenstuhank
Atty

COLUMBIA PLANOGRAPH CO., WASHINGTON, D. C.

UNITED STATES PATENT OFFICE.

WILLIAM JENKINS, OF MEAFORD, ONTARIO, CANADA.

HOLDING DEVICE FOR COGS.

1,056,687.  Specification of Letters Patent.  Patented Mar. 18, 1913.

Application filed August 29, 1910. Serial No. 579,427.

*To all whom it may concern:*

Be it known that I, WILLIAM JENKINS, of the town of Meaford, in the county of Grey, in the Province of Ontario, Canada, have invented certain new and useful Improvements in Holding Devices for Cogs, of which the following is the specification.

The present invention relates to improvements in holding devices for cogs or gear teeth, and consists in providing a device by means of which the bevel or angle at which the cog or tooth to be cut is accurately gaged, and the blank held in such set position while being cut.

Another object of the invention is to provide a device for cutting angular recesses in the same blank that will serve as key seats in securing the cog or gear tooth into the hub of the wheel.

The arrangement and construction of parts is more particularly explained and set forth in the following specification.

Figure 8:
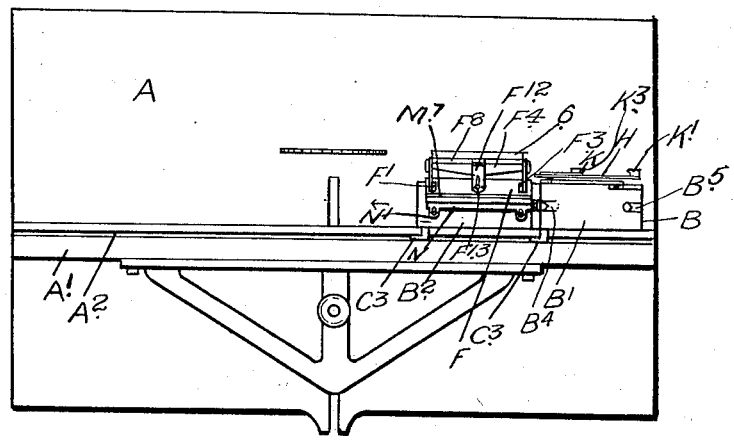
Figure 9:
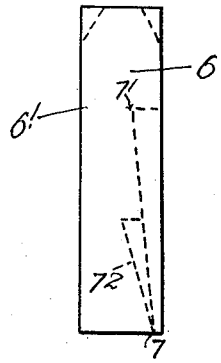
Figure 10:
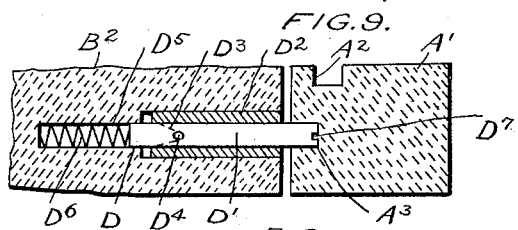

Figure 1, is a general perspective view of my device. Fig. 2, is a similar view to Fig. 1 partially broken away and in section to more clearly exhibit the construction of my device. Fig. 3, is a cross sectional view on line $x$—$y$, Fig. 1. Fig. 4, is a detail of one of the adjustable members for supporting the cog blank while cutting the tenon. Fig. 5, is a similar view to Fig. 4 showing a similar device for cutting thin teeth. Fig. 6, is a perspective view of a blank from which a cog is cut. Fig. 7, is a perspective view of a cog when cut. Fig. 8, is a plan view of a saw table. Fig. 9, is an end view of the gear blank. Fig. 10 is a sectional detail showing the spring plunger employed in my device, it being understood that the outer end of the spring plunger D' extends when the machine is in operation into the groove $A^3$ in the guide block.

In the drawings like letters of reference indicate corresponding parts in each figure.

A is a saw table provided with a guide block A' having guide grooves $A^2$ and $A^3$.

B is my gage device comprising the rear rectangular hollow base portion B' and a forwardly extending portion $B^2$. My gage device B is supported on suitable rollers $B^3$ (see Fig. 3). The rollers $B^3$ are suitably journaled in the bottom of the portions B' and $B^2$ of my device.

$B^4$ and $B^5$ are handles by which the device is moved longitudinally over the saw table toward the saw in a direction parallel with the guide block A', the saw being located to the front side of my device so as to engage the cog tooth held thereby as the device is moved forwardly in the direction indicated by arrow in Fig. 1.

To hold my device so that it moves parallel with the block A' I provide studs C one of which is supported on a standard C' and the other on the far side of the portion B' of the base portion of my device as indicated in Fig. 2 of the drawing.

$C^3$ are tongues secured upon the studs C by set screws $C^4$. The tongues $C^3$ travel in the groove $A^2$ as my device B is carried over the saw table in a backward or forward direction.

To hold the device down to its work I provide spring plungers D designed to enter the groove $A^3$ of the guide block A'. The spring plunger D comprises a plunger rod D' slidably held in the sleeve $D^2$ having an end notch $D^3$ indicated by dotted lines in Fig. 10. The plunger rod D' is provided with a laterally extended pin $D^4$ extending into the notch $D^3$. The inner end of the plunger rod D' extends into the recess $D^5$ formed in the forwardly extending portion $B^2$ of the body of the machine.

$D^6$ is a compression spring held in the recess $D^5$ against the inner end of the plunger rod D'. The opposite end of the plunger rod D is provided with a cross groove $D^7$.

When it is desired to place the machine in a suitable case or when for any reason it is desired that the plunger rod D' does not extend beyond the face of the portion $B^2$, I insert a screw-driver or other suitable instrument into the groove $D^7$ of the rod D' forcing the rod inwardly against the compression spring $D^6$ so as to carry the pin beyond the end of the sleeve $D^2$. The plunger rod is then given a quarter turn so as to carry the pin $D^4$ out of alinement with the notch $D^3$ to bear against the end of the sleeve. By this means it will be seen that the device will be held down to the table as it moves in a back and forward direction.

I will first describe the mechanism by which the blank is held so that the tenon may be cut by the saw as my device is reciprocated on the saw table.

F is a casting provided with standards F' $F^2$ and $F^3$.

$F^4$ is a plate which is swiveled on a stud $F^5$ on the lower horizontal portion of the casting F. At each end the plate is provided with arc-shaped slots $F^6$ concentric to the center of the stud $F^5$.

$F^7$ are clamping nuts extending through the slots $F^6$ into the horizontal portion of the casting F. By this means the plate $F^4$ may be swung horizontally to any angle and secured.

$F^8$ is a vertical plate hinged to the plate $F^4$ by cross bolts $F^9$.

$F^{10}$ are slotted hinged arms provided at each end of the plate $F^8$ through the slots of which set screws $F^{11}$ extend into the standards $F'$ and $F^3$. By this means when the plate $F^4$ is swung horizontally it may be held at any angle by means of the clamping set screws, $F^{11}$. To hold the plate $F^8$ at any vertical angle I provide the slotted hinged arm $F^{12}$ through the slot of which the set screw $F^{13}$ extends into the center standard $F^2$. The plate $F^8$ is provided with horizontal slots 2 3 and 4 and a series of holes 5. At the opposite ends of the plate $F^8$ are secured devices G designed to form a pocket in which is supported the blank of the cog. The devices G comprise a stationary member $G'$ and a slidable member $G^2$ (see Fig. 4).

The member $G'$ is provided with rearwardly extending lugs $G^3$ and $G^4$ having orifices $G^5$. The member $G^2$ is slidably held behind the member $G'$ and is provided with a forwardly extending lug $G^6$ provided with a threaded orifice $G^7$. The upper end of the member $G^2$ is provided with a guide tongue $G^8$ and a supporting tongue $G^9$ extending through the notch $G^{10}$ formed in the member $G'$. By moving the screws 2' and 3' in the slots 2 and 3 the device may be adjusted to any angle desired.

$G^{11}$ is a threaded spindle extending loosely through the orifice $G^5$ and threaded through the orifice $G^7$. The spindle is provided with a knurled nut $G^{12}$. By rotating the nut $G^{12}$ and the spindle $G^{11}$ the lug $G^6$ will be gradually carried upwardly by the spindle carrying with it the member $G^2$ provided with the tongue $G^9$.

It will be understood that when the blank 6 is placed in position the shoulders $G'$ and $G^2$ rest upon the tongues $G^9$. The plate $F^8$ is then adjusted so as to incline backwardly toward the bottom of the machine in the position to cut the tenon, that is the cut 7 7' indicated by dotted lines in Fig. 9. When this cut has been made the plate $F^8$ is inclined in such a direction as to allow of the cut 7 7² being made to form a key seat in the tenon of the cog. The key seat is formed in the tenon so that such tenon may be secured in a suitable hub or rim by a suitable form of key fitting into a seat formed in the hub or rim and the seat formed in the tenon.

The next operation necessary is to cut off what is termed the slab, that is, that portion cut by the aforesaid operation from the main body or shank of the cog. To accomplish this the cog is placed in the machine in the dotted position shown in Fig. 3 of the drawing. I will now describe the operation by which the cog in this position is held during the cutting of the slab.

H is a face plate of the main portion of the machine comprising a rectangular hollow portion $H'$ having a longitudinal extension $H^2$ extending along the front of the portion $B^2$ of the machine.

$H^3$ are lugs extending from each end of the portion $H'$ and $H^4$ are screw spindles. On referring to Fig. 3 of the drawing it will be noticed that the rear of the hollow portion $H'$ of the machine is inclined at $B^7$.

$B^8$ are screw studs (see Fig. 3) extending into the portion $B'$ and forming a standard.

$B^9$ is the tilting plate pivoted on the standard $B^8$ centrally of its length. Each end of the plate is provided with a reduced portion $B^{10}$.

$B^{11}$ are clevises extending over the ends of the portion $B^{10}$, and pivoted thereto and into which the screw spindles $H^{10}$ extend.

$H^5$ is a plate having a hinge connected with the plate $B^9$.

$H^6$ is a hook bar pivotally located in the groove $H^7$ formed in the base of the machine. The hooked end of the bar extends upwardly through an orifice $H^9$ into contact with the plate $H^5$ serving to support the plate.

$H^{10}$ is a plate pivotally connected at $H^{11}$ to the plate $H^5$. The plate inclines downwardly from its pivot point toward the plate $B^9$ and then extends upwardly through a slot $H^{12}$ formed in the plate $H^5$ and is provided with a horizontal extension $H^{13}$.

J are slots formed at each end of the portion $B'$ of the machine.

$J'$ is a cross bar extending through the slots J over the plate $H^5$. The cross bar $J'$ may be clamped in any position in the slots J by means of wing nuts $J^2$ threaded on to the ends thereof.

K and $K'$ are adjustable plates provided with vertical slots $K^2$ and knife edges $K^3$ designed to grip the ends of the cog beneath the shoulders 6' and 6². The plate K is supported upon a supplemental plate $K^4$ having a longitudinal slot $K^5$.

$K^6$ are a series of holes formed in the face plate $H'$ and into which the threaded studs $K^7$ extend so as to provide means for adjusting the plate $K^4$ longitudinally.

L is a supplemental plate pivotally connected at $L'$ to the plate $B^9$.

$L^2$ is a vertical movable bar provided with a series of holes $L^3$ into which the pin $L^4$ extends. The bar $L^2$ is provided with a vertical slot $L^5$ through which extends the pin $L^6$ from the body of the machine.

$L^7$ is a pull bar provided with an inclined slot $L^8$ through which the pin $L^6$ also passes.

The slotted end of the pull bar is provided with an inclined portion $L^9$ upon which the roller $L^{10}$ journaled at the upper end of the bar $L^2$ rides.

$L^{12}$ is a pull handle forming part of the pull bar and $L^{13}$ is a compression spring held upon the reduced portion $L^{14}$ of the pull bar $L^7$ between the lug $L^{15}$ and the body of the pull bar. When it is desired to cut the slab off to form the tenon portion the cog is placed in the machine in the position shown in Fig. 3 of the drawings. The bar $J'$ and plates $B^9$ and L are then adjusted to clamp the cog in the required inclined position horizontally corresponding to the required longitudinal bevel of the cog.

It will be seen that as the device passes over the saw table the end of the hook bar $H^6$ supports the hinged plate $H^5$ and consequently the slab. When the slab has been severed from the cog and the gage device passes over the end of the saw table the bar $H^6$ drops on its hinge allowing the plate $H^5$ to drop. As the plate $H^5$ drops the plate $H^{10}$ strikes the interior of the hollow portion $B'$ so as to carry the vertical portion of the plate $H^{10}$ and the portion $H^{13}$ against that end of the slab next the head of the cog or at the top of the tenon giving it a slight blow sufficient to free that end of the slab from the tenon after the slab is severed by the saw. Simultaneously the pull bar $L^7$ is released releasing the outer end of the slab.

The next operation I will describe is to cut the longitudinal taper of the tooth. I first remove the casting F and the parts attached thereto by loosening the bolt $M^5$ and slipping the horizontal portion of the casting F from beneath the block $M^4$. The machine is then arranged as shown in Fig. 2 of the drawings. The extension $H^2$ hereinbefore described is provided with a series of sharpened spikes M. The portion $B^2$ is provided with a slotted plate $M'$ set in a recess $M^2$ and provided with overhanging sides $M^3$.

$M^4$ is a block swiveled to the portion $B^2$ by a suitable bolt $M^5$ having a square nut $M^6$ fitting the slot of the plate $M'$. The block $M^4$ is provided with a vertical plate $M^7$ against which the side of the cog bears, the plate being provided with a stop $M^8$ against which the end of the cog abuts. The block $M^4$ is swiveled on the bolt $M^5$ so that it may be adjusted to any horizontal angular position. In cutting the bevel of the cog the head of the cog is placed on the extension $H^2$ so as to be gripped by the spikes or projections M and so that the inside face of the cog bears against the plate $M^7$ and the end of the cog against the stop $M^8$.

It will of course be understood that the bolt $M^5$ may be adjusted longitudinally in the slotted plate $M'$ so as to allow of cutting any size of cog.

N is an adjustable plate provided with slotted projections $N'$ through the slot of which set screws $N^2$ extend into the block $M^4$. By means of the slots $N'$ the plate may be adjusted so as to bear against the tenon portion of the cog and support the same while the longitudinal bevel is being cut. To cut the bevel O at each side at the head of the cog I place the cog on the sharpened upper edge of the plate $M^7$ abutting the stop block $O'$ and resting against the plate N in an inclined position. In this position the bevel O is cut.

To prevent the device from traveling too fast over the saw I provide a brake plate $O^3$ secured to the bottom of the device.

$O^4$ is a screw spindle bearing against the brake plate $O^3$ so as to adjust the tension or frictional contact of such brake plate against the surface of the saw table.

$O^5$ is a stop which by coming in contact with the end of the saw table guide block prevents the device sliding off the saw table when in an inclined position and not in use.

Each of the devices G hereinbefore described may be provided with a supplemental block $O^6$ provided with a lug $O^7$ through which the spindle $G^{11}$ also extends and a pin $O^8$ fitting into a corresponding hole in the member $G'$. By means of this block it will be readily seen that a thinner cog may be cut by reason of its holding the cog farther over toward the saw than would otherwise be the case.

It will of course be understood by referring to Figs. 1 and 3 that the bracket F is removed from the device before such device is used as shown in Fig. 2 for cutting the longitudinal taper and bevel of the tooth.

V is a saw dust guard designed to prevent sawdust interfering with the rollers $B^3$.

From this description it will be seen that I have devised a machine by which bevel cogs may be held in various positions, so that all the cuts necessary to form such bevel tooth may be made by a circular saw and by which all sizes of blanks from which various sizes of teeth are cut may be held.

What I claim as my invention is:

1. In a gage device for cutting wooden gear teeth, the combination with the saw and saw table, of a base block mounted on suitable rollers, guides for the block arranged so that the block travels parallel with the face of the saw and a vertical holding pocket for the gear blank connected to the side of the block so that the blank held thereby overhangs the saw and means for adjusting the pocket to any desired vertical or horizontal incline as and for the purpose specified.

2. In a gage device for cutting wooden gear teeth, the combination with the saw and saw table, of a base block mounted on suitable rollers, guides for the block arranged so that the block travels parallel with the face of the saw, a horizontal plate swung on a vertical central axis, a vertical plate hinged at the bottom to the edge of the horizontal plate next to the saw and adjustable members forming a pocket secured to the vertical plate so as to hold the blank in a position overhanging the saw.

3. In a gage device for cutting wooden gear tooth blanks, the combination with the slidable base block, the hinge plate, and means for adjusting the angular set of the plate, of pocket members for holding the blank comprising bars adjustably secured to the plate and supplemental bars longitudinally adjustable on the aforesaid bars and so arranged as to extend beneath suitable portions of the gear tooth blank to support the same.

4. In a device of the class described, the combination with the slidable base block, the hinged plate, and means for adjusting the angular set of the plate, of pocket members comprising a bar adjustably secured to each end of the plate, supplemental movable bar members connected to each of the aforesaid members and longitudinally adjustable in relation thereto, and so positioned as to engage the gear blanks at their upper end, as and for the purpose specified.

5. In a device of the class described, the combination with the slidable base block, the hinged plate, and means for adjusting the angular set of the plate, of pocket members comprising a stationary bar adjustably secured to each end of the plate and each bar having a rearwardly extending lug having an orifice, supplemental movable bar members each having a forwardly extending lug having a threaded orifice and a threaded spindle extending loosely through the orifice of each rearwardly extending lug, and threaded into the threaded orifice of each forwardly extending lug, as and for the purpose specified.

6. In a gage device for cutting wooden gear teeth, the combination with the slidable base block, of a horizontal base plate extending from the base block, a plate swiveled centrally to the aforesaid plate and having its outer edge coinciding with the outer edge of the base block plate, the swiveled plate being adjustably connected to the base plate at each end, a vertical plate hinged at its lower edge to the outer edge of the centrally swiveled plate, slotted plates hinged to each end and to the center of the edge of the main hinged plate and set screws connecting such hinged plates to suitable portions of the base block.

7. In a gage for cutting wooden gear tooth blanks, means for holding the beveled gear tooth blank while cutting the slab therefrom, comprising a hollow rectangular base block supported on suitable rollers and having vertical slots at each end thereof, and suitable operating handles, a rod adjustably held within the slots and a blank supporting table located beneath the rod and means for adjusting the angular position of the rod and table as and for the purpose specified.

8. In a gage for cutting wooden gear tooth blanks, means for holding the beveled gear tooth blank while cutting the slab therefrom, comprising a hollow rectangular base block supported on suitable rollers and having vertical slots at each end thereof, and suitable operating handles, a rod adjustably held within the vertical slots, a vertical plate pivoted centrally to the base blank and means for adjusting the ends of the plate, so as to vary the angle thereof, a hinged table connected to the plate and means for temporarily supporting the table while cutting the slab and for automatically releasing the table after cutting the slab, so as to discharge the same, as and for the purpose specified.

9. In a gage for cutting wooden gear tooth blanks, means for holding the beveled gear tooth blank while cutting the slab therefrom, comprising a hollow rectangular base block supported on suitable rollers and having vertical slots at each end thereof, and a suitable operating handle, a rod adjustably held within the vertical slots a vertical plate pivoted centrally to the base blank and means for adjusting the ends of the plate, so as to vary the angle thereof, a hinged table connected to the plate, means for temporarily supporting the table while cutting the slab and for automatically releasing the table after the cutting of the slab, so as to discharge the same, a supplemental plate hinged to the aforesaid vertical plate, a spring pull plunger, and means for carrying the free end of the plate into contact with the blank, as and for the purpose specified.

10. In a gage for cutting wooden gear tooth blanks, means for cutting the longitudinal taper of the bevel tooth blank comprising a base block provided with an upper gripping surface, a swivel block supported on the base block and provided with a face plate forming a groove in which the upper edge of the blank rests and having a stop at one end thereof and a laterally adjustable plate secured to the block and against which the tenon portion of the blank rests in an inclined position, as and for the purpose specified.

11. In a gage for cutting wooden gear tooth blanks, a key holding mechanism comprising a base block having a suitable gripping surface, a standard secured to the base block, a lower gripping member connected to the standard plate, a pull bar, means for raising the lower gripping member so as to tilt the key supported thereby and an upper gripping member and pull bar, means for forcing such gripping member in contact with a key when held in the aforesaid tilted position as and for the purpose specified.

12. In a gage device for cutting wooden gear teeth blanks, means for holding the bevel gear blank while cutting the slab therefrom, comprising a hollow rectangular base block having vertical slots at each end thereof, a rod adjustably held within the slots at each end, a blank supporting table located beneath the rod, means for adjusting the angular position of the rod and the table, and means for temporarily gripping the blank during the cutting of the slab.

13. In a gage device for cutting wooden gear teeth blanks, means for holding the bevel gear blank while cutting the slab therefrom, comprising a hollow rectangular base block having vertical slots at each end thereof, a rod adjustably held at each end in the slots, a vertical plate pivoted centrally to the block, means for adjusting the ends of the plate in a vertical plane, a blank supporting table hinged to the plate and extending into the hollow portion of the block, means for supporting the table in a horizontal position and designed to be released after the slab is cut from the blank.

14. In a gage device for cutting wooden gear teeth blanks, means for holding the bevel gear blank while cutting the slab therefrom comprising a hollow rectangular base block, a vertical plate pivoted centrally to the block, means for adjusting the ends of the plate in a vertical plane, a blank supporting table hinged to the plate and extending into the hollow portion of the block, a bar extending longitudinally over the table and angularly adjustable, a supplemental plate hinged at one end to the vertical plate, a pull bar, and connecting means between the pull bar and plate designed to force the same against the blank.

15. In a gage device for cutting wooden gear teeth blanks, means for holding the bevel gear blank while cutting the slab therefrom comprising a hollow rectangular base block, a blank supporting table hinged in the hollow portion of the block and having a longitudinal slot therein, means for adjusting the angular set of the table, an inclined plate hinged beneath the table and extending through the slot, a bar extending longitudinally on the table and means for adjusting the angular set of the same.

WILLIAM JENKINS.

Witnesses:
W. T. ALLAN,
JOHN ROSE.

---

Copies of this patent may be obtained for five cents each, by addressing the "Commissioner of Patents, Washington, D. C."